Patented Nov. 7, 1939

2,178,809

UNITED STATES PATENT OFFICE 2,178,809

HEAVY METAL CYCLIC NITROSO COMPOUNDS AND A PROCESS OF MAKING THEM

Edgar F. Rosenblatt, East Orange, N. J., assignor to Baker & Company, Inc., Newark, N. J., a corporation of New Jersey No Drawing. Application February 27, 1936, Serial No. 66,069

11 Claims. (Cl. 260—429)

This invention is directed to heavy metal cyclic nitroso compounds wherein the metal is held in a complex and generally in non-ionized form and a process of making them.

The present invention further relates to uses of such compounds, as, for example, in solution in various organic solvents for various purposes. One of the particular uses of the present invention is a composition consisting essentially of petroleum hydrocarbons, benzol, benzol-alcohol mixtures, alcohols or other fuels of organic nature having dissolved therein, either directly or by the intermediate use of a common solvent, the compounds described herein. Some of the compounds are deeply colored and may be applicable as coloring substances.

In practicing the present invention, I utilize a compound of metals taken from the class of metals capable of forming compounds having an essentially non-ionized nitroso group or a nitrite group. Metals not included in the above class are normally not precipitated by hydrogen sulphide and afterwards by ammonium sulphide and ammonium hydrate treatment commonly used in qualitative analyses. Among the metals of the class comprising my invention, I may mention copper, silver, cobalt, nickel and chromium. A compound having a nitrite group is caused to react with an inorganic or an organic compound containing a reactive hydrogen which is capable of reacting with the oxygen of the nitrite group with the elimination of $H_2O$ to form a complex. Preferably, organic compounds having such reactive hydrogen are used for producing the desired complexes.

In view of the premises, it is one object of the present invention to produce compounds of these metals, which compounds are soluble in many organic solvents and show therein a high degree of stability when exposed to ordinary conditions of light, heat, gases and the like. These compounds are non-acid in character and do not react ordinarily to produce an acid. They are characterized by the absence of halogens (chlorine, bromine and iodine). As it is possible to prepare a considerable variety of compounds of these metals, I can modify the properties of the compounds to suit nearly every purpose desired. It has thus become possible to bring many such compounds of the metals into solution in benzol, petroleum hydrocarbons, or similar solvents.

Whenever nitrite compounds of the metals comprised in my invention are used I employ as a rule complex nitrite compounds. The simple nitrites either do not exist or are not stable. The unstable simple nitrites can be converted into stable complex nitrite compounds of the Werner type by combining them with amino groups or nitrites of other metals. In all cases the nitrite group of the compounds must be bound to the metal in a non-ionized form. This is also true with regards to simple nitrites.

As to the hydrogen containing compounds which react with the metal containing complex, both inorganic and organic substances have been found suitable. However, I have found that the organic compounds, and particularly certain aromatic materials such as amines, phenols, and the like are especially suitable for the purpose. The character of the reactions taking place is somewhat complex, and, in some cases, the resulting products are not well defined crystalline substances but are resinous or semi-liquid in character.

As representative of a reaction involving an amine, the following, which uses aniline hydrochloride, may be taken:

$(NH_3)_2M(ONO)_2 + 2C_6H_5NH_2HCl \rightarrow$
$\qquad (NH_3)_2M(ONNC_6H_5)_2 + 2H_2O + 2HCl$ In this equation, as well as in the following equations, the symbol "M" is intended to indicate a metal of the class above described.

The nature of the reaction with phenols or naphthols is somewhat difficult to ascertain as the products of the reaction are generally resinous, but most likely the reaction can be represented by the following equation:

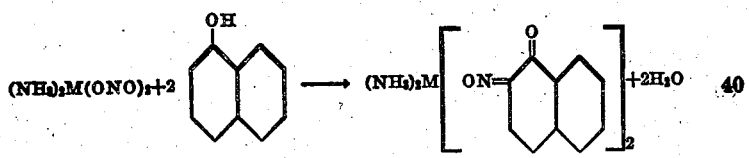

The compound is therefore believed to be a quinone-oxime and may have a tendency to isomerize to a nitroso naphthol, as follows:

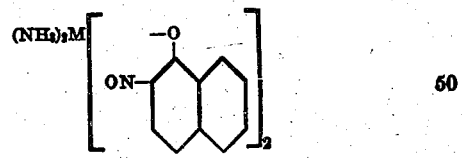

Although the above equations show the use of definite compounds, these equations should be considered as merely illustrating the nature of the new compounds, and should not be considered as a limitation on the scope of the present invention. The $NH_3$ group may, of course, be replaced by other amino groups, for example, those wherein one or more of the hydrogen atoms of ammonia are replaced by radicals, usually of organic nature. The term amino group should be understood in the broad sense in which it is used in Werner's Complex Chemistry, and as such includes also such groups as hydrazin, hydroxylamine, thioether, phosphine, arsenide, and others.

In a similar manner, in place of the naphthol or aniline, other compounds of a similar nature having a greater or smaller number of carbon atoms and having some of the hydrogen atoms on the rings replaced by various radicals, may be used therein. Heterocyclic compounds may also be used instead of isocyclic compounds.

Many of the products discovered by me and described herein are soluble to a greater or smaller extent in benzol, carbon tetrachloride, alcohols of different kinds and other solvents. Some of these solutions are, in turn, miscible with or soluble in gasoline or other hydrocarbons and other liquids having fuel value, whereby a small amount of the metal is held in stable combination in the resulting solution.

The addition of said metals to gasoline or the like has been found to have an important influence on the characteristics of the gasoline when used as fuel in internal combustion engines whereby the combustion becomes more effective and more suitable for efficient operation of the engine.

The following are several specific examples of the practice of this invention illustrating the nature thereof:

Example 1

Silver nitrite is dissolved in an excess of aniline by shaking the mixture without warming, as heating may cause reduction of the nitrite to metallic silver. A few drops of acetic acid are added and the solution gradually assumes a deep red color. Allowing the solution to stand, crystallization begins and methyl alcohol may be added in order to obtain further precipitation of the product. The precipitate is filtered and washed with methyl alcohol and ether to dry the same. The crystals are orange colored. The product may be further purified by recrystallization with benzol.

The exact constitution of the product is not known, but it may be either $Ag(C_6H_5NH_2)ON_2C_6H_5$ or

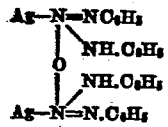

The reaction probably takes place in two stages, in the first of which the silver nitrite reacts with the aniline to form silver amino nitrite. Then, on the addition of a small amount of acid, a further reaction takes place between the intermediate product and the excess of aniline to give the final reaction product.

Example 2

1 g. of sodium cobaltinitrite having the formula $Na_3Co(NO_2)_6$ is dissolved in the minimum amount of water necessary to produce a solution and to the same is added three grams of alpha-naphthol in ethyl alcohol. The solution changes color showing the formation of the desired cobalt naphthol complex. To the solution is added benzol and the mixture is shaken and then separated in a separatory funnel. The reaction product is in the benzol layer which is evaporated to concentrate the same. Gasoline is added whereby a red powder is precipitated and the latter is washed with methyl alcohol to remove foreign matter therefrom.

Example 3

Copper di-pyridine nitrite, $Cu(C_5H_5N)_2(NO_2)_2$, is dissolved in meta toluidine and beta naphthol is added. The solution is boiled giving a deep red solution containing the reaction product. The solution may be diluted with benzol and further diluted with gasoline, the benzol acting as a mutual solvent whereby the product becomes soluble in the gasoline.

Example 4

In a similar manner as in Example 3, one may start with nickel di-pyridine nitrite having a formula $Ni(C_5H_5N)_2(NO_2)_2$ dissolved in o-toluidine and cause it to react with naphthol or other phenols to give the organo-metal complex.

Example 5

1 g. of copper di-pyridine nitrite is mixed with 1.5 g. of alpha-naphthol in methyl alcohol and a few drops of pyridine are added. The mixture is warmed whereby the solution gradually assumes a deep red color. The solution is then poured into ammonia water causing the formation of a yellow precipitate which is filtered and dissolved in acetic acid, whereby the amino groups are removed. Upon the further addition of water, the purified product is again precipitated.

In order to remove any excess naphthol which may be present in the precipitate, the same may be repeatedly washed with ether and thereby the reaction product is further purified.

The formula of the product is not at all certain, but it appears to contain 2.5 molecules of naphthol for each atom of copper which corresponds to the following formula:

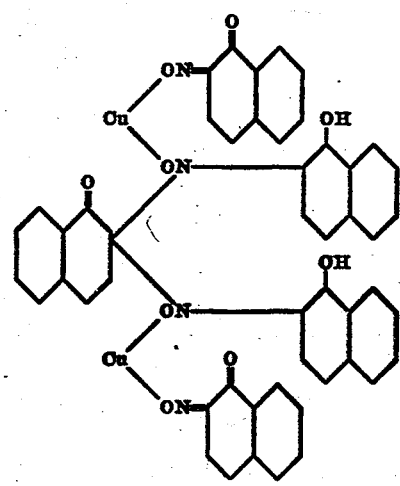

The above examples illustrate the character of the present invention, but they are not to be considered as limiting the same. Similar results may be obtained by causing reactions to occur with compounds of other metals of the specified class, as the reaction appears to proceed with all such metals. Simple nitrites, as well as complexes containing the same, may be used in the reaction. The resulting products are stable and do not develop acids or acidity in solutions of organic substances.

It is apparent that various changes in the proportions of ingredients, in the conditions of the reaction and in the final treatment of the reaction products, may be made within the skill of the chemist. Therefore, the present invention is to be broadly construed and not to be limited except by the claims appended hereto.

What I claim is:

1. The reaction product of a compound containing a heavy metal and at least one nitrite group and a cyclic organic compound having a reactive hydrogen, said reactive hydrogen reacting with oxygen of said group under the formation of a compound containing the radicals of both starting compounds combined into one molecule.

2. The reaction product of a compound containing a heavy metal taken from the class consisting of copper, silver, cobalt, nickel and chromium and at least one nitrite group and a cyclic organic compound having a reactive hydrogen, said reactive hydrogen reacting with oxygen of said group under the formation of a compound containing the radicals of both starting compounds combined into one molecule.

3. The reaction product of a compound containing a heavy metal and at least one nitrite group and an aromatic amine, the reactive hydrogen of said amine reacting with oxygen of said group under the formation of a compound containing the radicals of both starting compounds combined into one molecule.

4. The reaction product of a compound containing a heavy metal and at least one nitrite group and a phenol, the reactive hydrogen of said phenol reacting with oxygen of said group under the formation of a compound containing the radicals of both starting compounds combined into one molecule.

5. The reaction product of a heavy metal ammino nitrite and an aromatic amine, the reactive hydrogen of said amine reacting with oxygen of the nitrite group to form a compound containing the radicals of both starting compounds into one molecule.

6. The reaction product of a heavy metal ammino nitrite and a phenol, the reactive hydrogen of said phenol reacting with oxygen of the nitrite group to form a compound containing the radicals of both starting compounds combined into one molecule.

7. A method of making complex metal compounds which comprises mixing a compound of a heavy metal having at least one nitrite group with a cyclic organic compound having a reactive hydrogen, adding an organic acid thereto, whereby said reactive hydrogen reacts with said group to link the radicals of both starting compounds into one molecule.

8. The reaction product of a compound containing a heavy metal and at least one nitrite group and an aromatic organic compound having a reactive hydrogen, said hydrogen reacting with oxygen of said group under the formation of a compound containing the radicals of both starting compounds combined into one molecule.

9. The reaction product of a compound containing a heavy metal taken from the class consisting of copper, silver, cobalt, nickel and chromium and at least one nitrite group and an aromatic organic compound having a reactive hydrogen, the said hydrogen reacting with oxygen of said group under the formation of a compound containing the radicals of both starting compounds combined into one molecule.

10. The reaction product of a compound containing a heavy metal taken from the class consisting of copper, silver, cobalt, nickel and chromium and at least one nitrite group and a phenol, the reactive hydrogen of said phenol reacting with oxygen of said group under the formation of a compound containing the radicals of both starting compounds combined into one molecule.

11. A method of making complex metal compounds which comprises mixing a compound of a heavy metal having at least one nitrite group with a cyclic organic compound having a reactive hydrogen, adding acetic thereto, whereby said reactive hydrogen reacts with said group to link the radicals of both starting compounds into one molecule.

EDGAR F. ROSENBLATT.